(12) United States Patent
Drysdale et al.

(10) Patent No.: US 8,529,811 B2
(45) Date of Patent: *Sep. 10, 2013

(54) COMPONENT PROTECTIVE OVERMOLDING USING PROTECTIVE EXTERNAL COATINGS

(75) Inventors: Richard Lee Drysdale, Santa Cruz, CA (US); Scott Fullam, Palo Alto, CA (US); Skip Thomas Orvis, San Jose, CA (US); Nora Elam Levinson, Washington, DC (US)

(73) Assignee: AliphCom, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/427,839

(22) Filed: Mar. 22, 2012

(65) Prior Publication Data
US 2012/0315379 A1  Dec. 13, 2012

Related U.S. Application Data

(63) Continuation of application No. 13/135,728, filed on Jul. 12, 2011, which is a continuation-in-part of application No. 13/158,416, filed on Jun. 11, 2011, which is a continuation-in-part of application No. 13/158,372, filed on Jun. 10, 2011.

(51) Int. Cl.
*B29C 45/14* (2006.01)

(52) U.S. Cl.
USPC ........... 264/135; 264/261; 264/265; 264/263; 264/272.14; 264/272.17; 264/255

(58) Field of Classification Search
None
See application file for complete search history.

(56) References Cited

U.S. PATENT DOCUMENTS

| | | | |
|---|---|---|---|
| 5,974,262 A | 10/1999 | Fuller et al. | |
| D439,981 S | 4/2001 | Kasabach et al. | |
| 6,254,815 B1 * | 7/2001 | Cheperak | 264/135 |
| D451,604 S | 12/2001 | Kasabach et al. | |
| 6,356,940 B1 | 3/2002 | Short | |
| D460,971 S | 7/2002 | Sica et al. | |
| 6,486,801 B1 | 11/2002 | Jones | |
| 6,527,711 B1 | 3/2003 | Stivoric et al. | |
| 6,595,929 B2 | 7/2003 | Stivoric et al. | |
| 6,605,038 B1 | 8/2003 | Teller et al. | |
| 6,714,859 B2 | 3/2004 | Jones | |
| 6,904,359 B2 | 6/2005 | Jones | |
| 6,952,645 B1 | 10/2005 | Jones | |

(Continued)

FOREIGN PATENT DOCUMENTS

| | | |
|---|---|---|
| CA | 2441962 | 9/2003 |
| CA | 2496579 | 3/2004 |

(Continued)

OTHER PUBLICATIONS

U.S. Appl. No. 13/405,240, filed Feb. 25, 2012, Drysdale et al.

*Primary Examiner* — Edmund H. Lee
(74) *Attorney, Agent, or Firm* — Kokka & Backus, PC

(57) ABSTRACT

Techniques for component protective overmolding using protective external coatings include selectively applying a protective material substantially over one or more elements coupled to a framework configured to be worn, the elements including at least a sensor, and forming one or more moldings substantially over a subset or all of the framework, the protective material and the elements, after the protective material has been selectively applied, at least one of the one or more moldings having a protective property.

26 Claims, 12 Drawing Sheets

(56) References Cited

U.S. PATENT DOCUMENTS

| | | |
|---|---|---|
| 7,020,508 B2 | 3/2006 | Stivoric et al. |
| 7,030,781 B2 | 4/2006 | Jones |
| 7,060,216 B2 * | 6/2006 | Schuurmans ............ 264/272.15 |
| 7,153,262 B2 | 12/2006 | Stivoric et al. |
| 7,261,690 B2 | 8/2007 | Teller et al. |
| 7,285,090 B2 | 10/2007 | Stivoric et al. |
| 7,343,260 B1 | 3/2008 | Kahn et al. |
| 7,400,970 B2 | 7/2008 | Jones |
| 7,457,719 B1 | 11/2008 | Kahn et al. |
| 7,502,643 B2 | 3/2009 | Farringdon et al. |
| 7,647,195 B1 | 1/2010 | Kahn et al. |
| 7,647,196 B2 | 1/2010 | Kahn et al. |
| 7,653,508 B1 | 1/2010 | Kahn et al. |
| 7,662,065 B1 | 2/2010 | Kahn et al. |
| 7,689,437 B1 | 3/2010 | Teller et al. |
| 7,690,556 B1 | 4/2010 | Kahn et al. |
| 7,705,723 B2 | 4/2010 | Kahn et al. |
| 7,747,735 B1 | 6/2010 | Kahn et al. |
| 7,753,861 B1 | 7/2010 | Kahn et al. |
| 7,788,059 B1 | 8/2010 | Kahn et al. |
| 7,800,044 B1 | 9/2010 | Kahn et al. |
| 7,839,279 B2 | 11/2010 | Kahn et al. |
| 7,841,967 B1 | 11/2010 | Kahn et al. |
| 7,849,184 B1 | 12/2010 | Kahn et al. |
| D631,552 S | 1/2011 | Kasabach et al. |
| D632,396 S | 2/2011 | Kasabach et al. |
| 7,881,902 B1 | 2/2011 | Kahn et al. |
| 7,907,901 B1 | 3/2011 | Kahn et al. |
| 7,917,768 B2 | 3/2011 | Kahn et al. |
| 7,959,567 B2 | 6/2011 | Stivoric et al. |
| 7,970,586 B1 | 6/2011 | Kahn et al. |
| 7,982,770 B1 | 7/2011 | Kahn et al. |
| 7,987,070 B2 | 7/2011 | Kahn et al. |
| 7,993,276 B2 | 8/2011 | Nazarian et al. |
| D645,968 S | 9/2011 | Kasabach et al. |
| 8,040,382 B2 | 10/2011 | Kahn et al. |
| 8,047,966 B2 | 11/2011 | Dorogusker et al. |
| 8,049,614 B2 | 11/2011 | Kahn et al. |
| 8,064,759 B1 | 11/2011 | Kahn et al. |
| 8,073,707 B2 | 12/2011 | Teller et al. |
| 8,083,643 B2 | 12/2011 | Ng et al. |
| 2002/0068873 A1 * | 6/2002 | Nissila .......................... 600/509 |
| 2004/0167409 A1 * | 8/2004 | Lo et al. ........................ 600/485 |

FOREIGN PATENT DOCUMENTS

| | | |
|---|---|---|
| CA | 2560323 | 6/2005 |
| CA | 2413220 | 11/2007 |
| CA | 2413148 | 8/2010 |
| CA | 2454655 | 8/2010 |
| EP | 1534126 | 3/2004 |
| EP | 2358266 | 3/2004 |
| EP | 1414340 | 5/2004 |
| EP | 1639939 | 3/2006 |
| EP | 1702560 | 9/2006 |
| EP | 1734858 | 12/2006 |
| EP | 2126828 | 8/2008 |
| EP | 1743571 | 5/2009 |
| IL | 167045 | 6/2003 |
| IL | 178183 | 6/2005 |
| IL | 153516 | 7/2007 |
| IL | 160079 | 2/2009 |
| IL | 153478 | 3/2009 |
| IL | 158067 | 3/2009 |
| JP | 200251105 | 2/2002 |
| JP | 2004-500949 | 1/2004 |
| JP | 200750091 | 6/2005 |
| JP | 2005-536260 | 12/2005 |
| JP | 4125132 | 5/2008 |
| JP | 4283672 | 6/2009 |
| KR | 1020027017160 | 10/2002 |
| KR | 1020027017525 | 10/2002 |
| KR | 1020037012845 | 10/2003 |
| KR | 102004001744 | 10/2004 |
| KR | 1020057003029 | 6/2005 |
| MX | PA2005002024 | 3/2005 |
| WO | WO/01/96986 | 12/2001 |
| WO | WO/02/00111 | 1/2002 |
| WO | WO/02/078538 | 10/2002 |
| WO | WO/03/015005 | 2/2003 |
| WO | WO/2004/019172 | 3/2004 |
| WO | WO/2005/016124 | 2/2005 |
| WO | WO/2005/092177 | 10/2005 |
| WO | WO/2008/101248 | 8/2008 |
| WO | WO/2010/065067 | 6/2010 |

* cited by examiner

COMPONENT PROTECTIVE OVERMOLDING USING PROTECTIVE EXTERNAL COATINGS

CROSS-REFERENCE TO RELATED APPLICATIONS

This application is a continuation of U.S. patent application Ser. No. 13/135,728, filed Jul. 12, 2011, Pending, entitled "Component Protective Overmolding Using Protective External Coatings," which is a continuation-in-part of U.S. patent application Ser. No. 13/158,416, filed Jun. 11, 2011, Pending, entitled "Component Protective Overmolding," which is a continuation-in-part of U.S. patent application Ser. No. 13/158,372, filed Jun. 10, 2011, Pending, entitled "Component Protective Overmolding," all of which are hereby incorporated by reference in entirety for all purposes.

FIELD

The present invention relates generally to electrical and electronic hardware, computer software, wired and wireless network communications, and computing devices. More specifically, techniques for component protective overmolding using protective external coatings are described.

BACKGROUND

With the advent of greater computing capabilities in smaller mobile form factors and an increasing number of applications (i.e., computer and Internet software or programs) for different uses, consumers (i.e., users) have access to large amounts of data, personal or otherwise. Information and data are often readily available, but poorly captured using conventional data capture devices. Conventional devices typically lack capabilities that can record, store, analyze, communicate, or use data in a contextually-meaningful, comprehensive, and efficient manner. Further, conventional solutions are often limited to specific individual purposes or uses, demanding that users invest in multiple devices in order to perform different activities (e.g., a sports watch for tracking time and distance, a GPS receiver for monitoring a hike or run, a cyclometer for gathering cycling data, and others). Although a wide range of data and information is available, conventional devices and applications generally fail to provide effective solutions that comprehensively capture data for a given user across numerous disparate activities.

Some conventional solutions combine a small number of discrete functions. Functionality for data capture, processing, storage, or communication in conventional devices such as a watch or timer with a heart rate monitor or global positioning system ("GPS") receiver are available, but are expensive to manufacture and typically require purchasing multiple, expensive devices. Other conventional solutions for combining data capture facilities often present numerous design and manufacturing problems such as size specifications, materials requirements, lowered tolerances for defects such as pits or holes in coverings for water-resistant or waterproof devices, unreliability, higher failure rates, increased manufacturing time, and expense. Subsequently, conventional devices such as fitness watches, heart rate monitors, GPS-enabled fitness monitors, health monitors (e.g., diabetic blood sugar testing units), digital voice recorders, pedometers, altimeters, and other conventional data capture devices are generally manufactured for conditions that occur in a single or small groupings of activities and, subsequently, are limited in terms of commercial appeal to consumers.

Generally, if the number of data inputs accessible by conventional data capture devices increases, there is a corresponding rise in design and manufacturing requirements and device size that results in significant consumer expense and/or decreased consumer appeal, which eventually becomes prohibitive to both investment and commercialization. Still further, conventional manufacturing techniques are often limited and ineffective at meeting increased requirements to protect sensitive hardware, circuitry, and other components that are susceptible to damage, but which are required to perform various data capture activities. As a conventional example, sensitive electronic components such as printed circuit board assemblies ("PCBA"), sensors, and computer memory (hereafter "memory") can be significantly damaged or destroyed during manufacturing processes where protective overmoldings or layers of material occurs using techniques such as injection molding, cold molding, and others. Damaged or destroyed items subsequently raises the cost of goods sold and can deter not only investment and commercialization, but also innovation in data capture and analysis technologies, which are highly compelling fields of opportunity.

Thus, what is needed is a solution for efficiently manufacturing devices without the limitations of conventional techniques.

BRIEF DESCRIPTION OF THE DRAWINGS

Various embodiments or examples ("examples") are disclosed in the following detailed description and the accompanying, drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
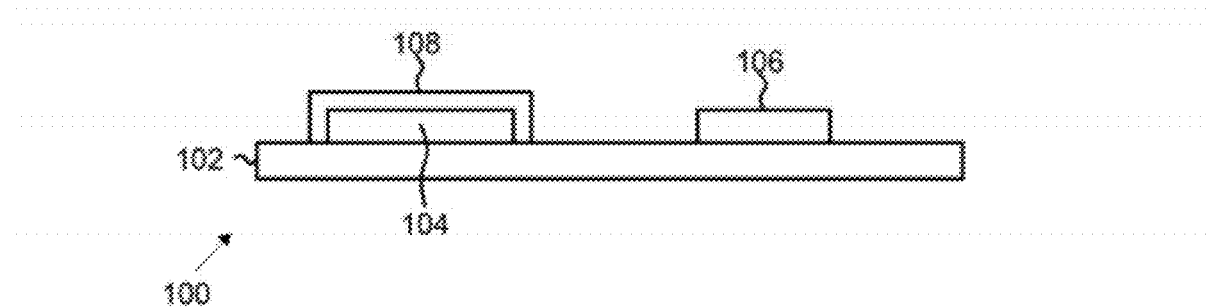
FIG. 1 illustrates a cross-sectional view of an exemplary process for providing protective material in component protective overmolding.

FIG. 1 illustrates a cross-sectional view of an exemplary process for providing protective material in data-capable strapband overmolding. Here, device 100 includes framework 102, elements 104-106, and covering 108. In some examples, framework 102 may be referred to interchangeably as a substrate, wafer, board (printed, unprinted, or otherwise), or other surface upon which elements 104-106 may be mounted, placed, or otherwise fixed. The type and configuration of elements may be varied and are not limited to any given type of electrical, electronic, or mechanical component. For example, element 104 may be implemented as a microvibrator or motor configured to provide a vibratory signal for an alarm or other indicator. Element 104 may also be a printed circuit board assembly ("PCBA"), logic, processor, microprocessor, memory (e.g., solid state, RAM, ROM, DRAM, SDRAM, or others), or other computing element and is not limited to any specific type of component. Further, element 104 may be coupled electrically or electronically to element 106, which may also be an electrical, electronic, or mechanical component that can be placed on framework 102. When placed on framework 102, elements 104-106 may be fixed using various techniques, including adhesives, mechanical fixing structures (e.g., posts and holes), or others, without limitation.

As shown, covering 108 may be placed over element 104 in order to protect the latter from damage resulting from the application of subsequent layers, coverings, moldings, or other protective material, regardless of environmental conditions (e.g., temperature, pressure, thickness, and others). As shown, element 104 is covered by covering 108 and element 106 is uncovered. However, other protective materials may be used to cover element 106. In still other examples, protective materials such as covering 108 may not be used if elements 104 or 106 are manufactured to resist the formation, deposit, layering, or covering of other protective materials at various temperatures, pressures, or other atmospheric conditions. In other examples, device 100 and the above-described elements may be varied and are not limited to those shown and described.

Figure 2:
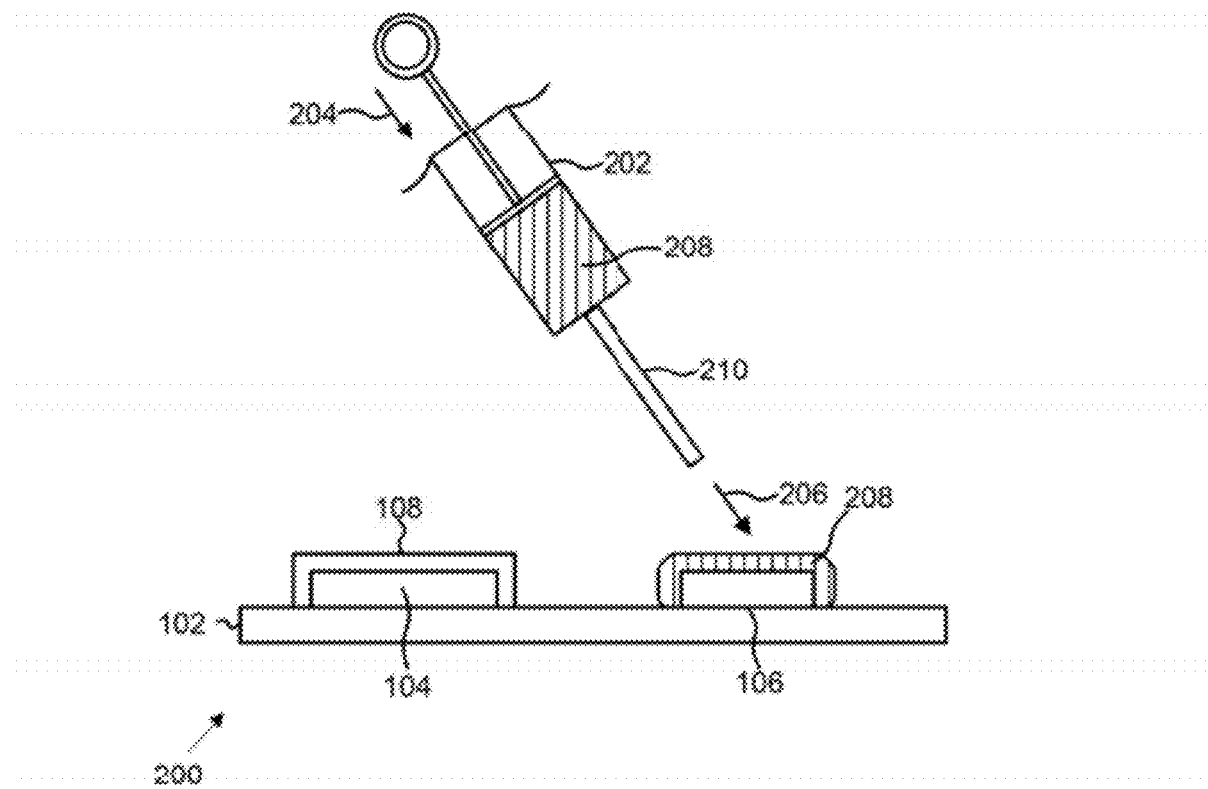
FIG. 2 illustrates another cross-sectional view of an exemplary process for providing protective material in component protective overmolding.

FIG. 2 illustrates another cross-sectional view of an exemplary process for providing protective material in data-capable strapband overmolding. Here, device 200 includes framework 102, elements 104-106, covering 108, syringe 202, arrows 204-206, and protective coating 208. In some examples, covering 108 and protective coating 208 may be referred to as "protective material" interchangeably and without limitation. As shown, like numbered elements shown in this drawing and others may refer to the same or a substantially similar element previously described.

In some examples, an applicator (e.g., syringe 202) may be used to selectively apply protective coating 208 to cover as a protective layer over element 106. As used herein, "selectively applying" may refer to the application, placement, positioning, formation, deposition; growth, or the like, of protective material to one, some, all, or none of any underlying elements (e.g., elements 104-106). In some examples, "protective material" may also be used interchangeably with "protective layer," "covering," "housing," or "structure" regardless of the composition of material or matter used, without limitation. In other words, covering 108 and protective coating 208 may each be referred to as "protective material" and used to protect underlying elements (e.g.; elements 104-106 (FIG. 1)) as described herein.

When the plunger of syringe 202 is depressed in the direction of arrow 204, protective coating 208 is forced through applicator tip 210 and applied as a protective layer over element 106. As an example, protective coating 208 may be applied at substantially atmospheric pressure by applying 1-2 psi of pressure to the plunger of syringe 202. When applied, protective coating 208 may be, for example, an ultraviolet ("UV") curable adhesive or other material. In other words, when protective coating 208 is applied (i.e., layered over element 106) and exposed to ultraviolet radiation (or other curing conditions) at levels similar to those found in natural sunlight or artificial-light, it coalesces and hardens into a covering that prevents the underlying element (e.g., element 106) from being damaged when other protective materials or layers are applied such as those shown and described below. Exemplary types of protective coating 208 may include coatings, adhesives, gels, liquids, or any other type of material that hardens to protect, prevent, minimize, or otherwise aid in avoiding damage to a protected element. Examples of UV curable coatings include Loctite® coatings produced by Henkel & Co AG of Dusseldorf, Germany such as, for example, Loctite® 5083 curable coating. Other types of curable coatings, in addition to those that are UV curable, may be used to protect underlying elements without limitation or restriction to any given type.

In some examples, protective material such as Loctite® or others may be applied selectively to one, some, or all electrical, electronic, mechanical, or other elements. Protective coating 208 may also be applied in different environmental conditions (e.g., atmospheric pressure, under vacuum, in a molding cavity or chamber, within a deposition chamber, or the like) and is not limited to the examples shown and described. As shown, protective coating 208 has been selectively applied to element 106, but not element 104, the latter of which is being protected by covering 108. As an alternative, covering 108 may be used as protective material in the form of an enclosure or physical structure that is used to protect an underlying element. As described herein, protective coating 208 may be selectively applied by determining whether sensitive components, parts, or other elements ("elements") are susceptible to damage or destruction from subsequent processes, for example, to deposit additional protective layers, such as those described in greater detail below. In other examples, device 200 and the above-described elements may be varied in function, structure, configuration, implementation, or other aspects and are not limited to those provided.

Figure 3:
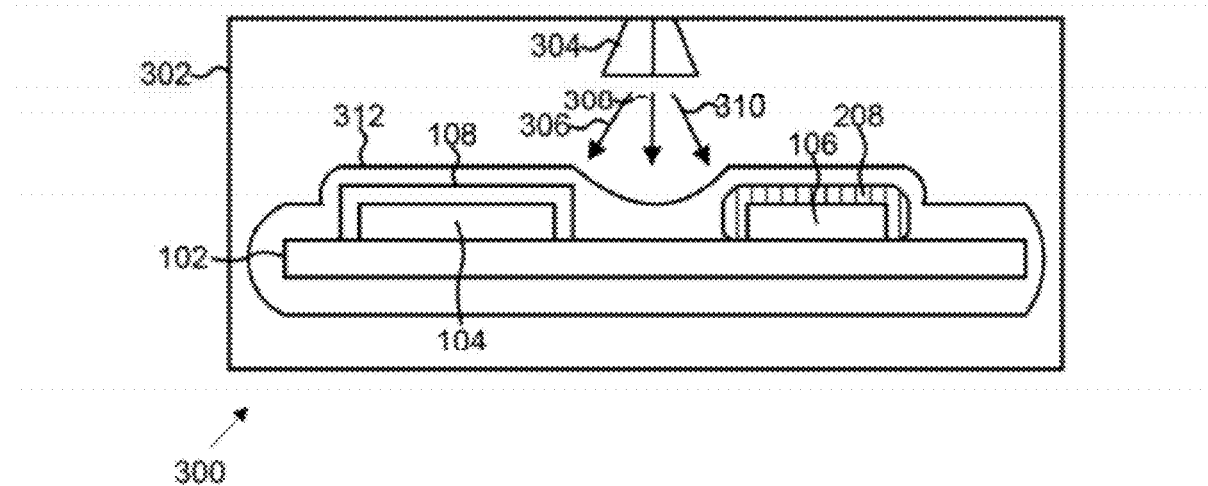
FIG. 3 illustrates a cross-sectional view of an exemplary process for forming an inner molding in component protective overmolding.

FIG. 3 illustrates a cross-sectional view of an exemplary process for forming an inner molding in data-capable strapband overmolding. Here, device 300 includes framework 102, elements 104-106, covering 108, syringe 202, arrows 204-206, protective coating 208, mold cavity 302, nozzle 304, arrows 306-310, and inner molding 312. In some examples, framework 102 and elements 104-106 having selectively applied protective coating 208 may be placed in mold cavity 302 where another protective layer or coating (e.g., inner molding 312) may be applied from nozzle 304 in the direction of arrows 306-310. Types of materials that may be used for inner molding 312 include plastics, thermoplastics, thermoplastic elastomers, polymers, elastomers, or any other organic or inorganic material that can molded in mold cavity 302. As shown, mold cavity 302 may be implemented using a variety of molding techniques. For example, an injection molding machine may be used to inject a thermoplastic polymer elastomer ("TPE") into mold cavity 302. When injected under temperature (e.g., 400 to 460 degrees Fahrenheit) and pressure (e.g., 200 to 600 psi, but which may be adjusted to higher or lower pressure, without limitation), inner molding 208 forms a protective layer around framework 102, elements 104-106, covering 108, protective coating 208, providing a layer of additional protective material (e.g., inner molding 312), which may completely or incompletely surround an object (e.g., framework 102). In some examples, inner molding 312 may be formed to provide a watertight or hermetic seal around framework 102 and elements 104-106. Types of materials that may be used as inner molding 312 include TPEs such as Versaflex 9545-1 as manufactured by PolyOne Corporation of McHenry, Ill. Other types of materials such as epoxies, polymers, elastomers, thermoplastics, thermoplastic polymers, thermoplastic polymer elastomers, and others may be used to form inner molding 312, without limitation to a specific material. In other examples, device 300 and the above-described elements may be varied in function, structure, configuration, implementation, or other aspects and are not limited to those provided.

Figure 4:
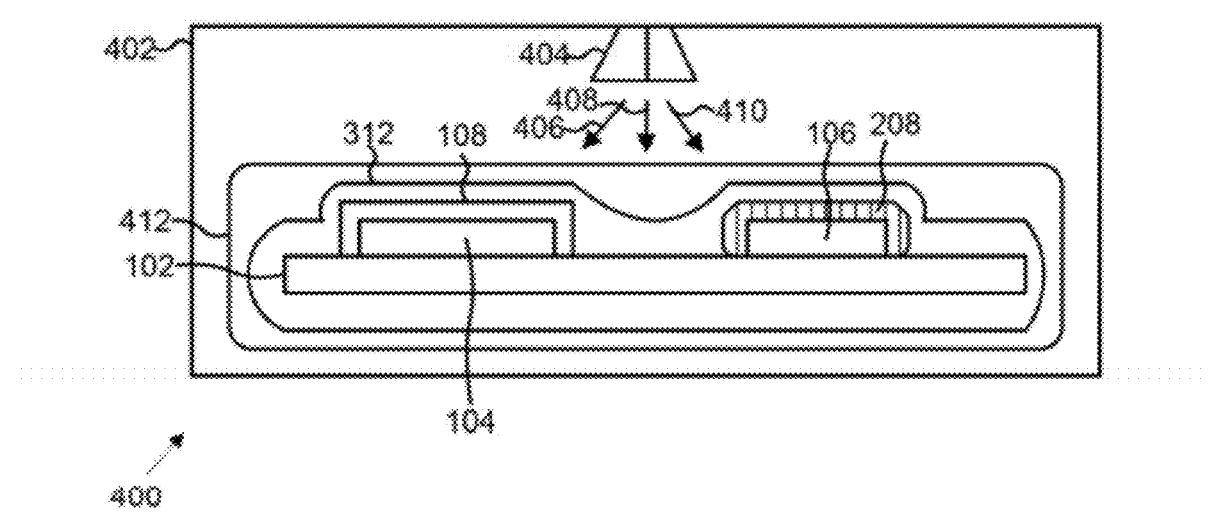
FIG. 4 illustrates another cross-sectional view of an exemplary process for forming an outer molding in component protective overmolding.
Figure 5A:
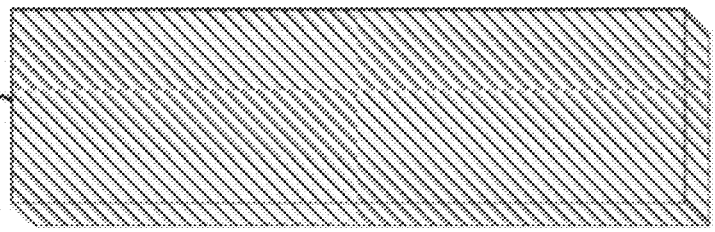
FIG. 5A illustrates an exemplary design applied during component protective overmolding.
Figure 5B:
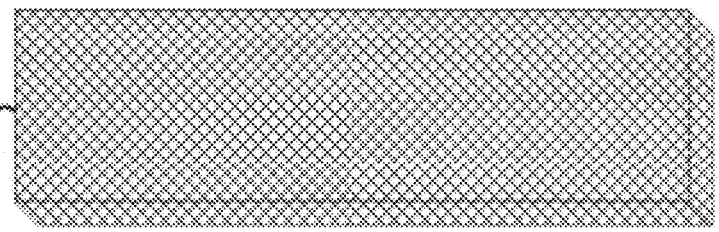
FIG. 5B illustrates another exemplary design applied during component protective overmolding.
Figure 5C:
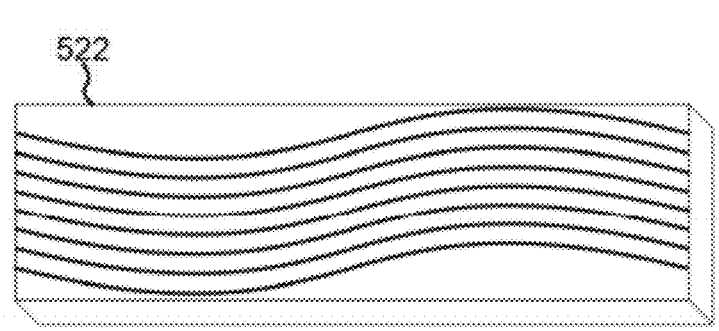
FIG. 5C illustrates a further exemplary design applied during component protective overmolding.

FIG. 4 illustrates another cross-sectional view of an exemplary process for forming an outer molding in data-capable strapband overmolding. Here, device 400 includes framework 102, elements 104-106, covering 108, syringe 202, arrows 204-206, protective coating 208, inner molding 312, mold cavity 402, nozzle 404, arrows 406-410, and outer molding 412. In some examples, mold cavity 402 may be the same or different from that described above in connection with FIG. 3. In other words, mold cavity 402 may be the same mold cavity as mold cavity 302, but which is used to injection mold outer molding 412. As shown, framework 102, elements 104-106, protective coating 208, and inner molding 312 are placed in mold cavity 402. Material (e.g., TPE) may be injected through nozzle 404 in the direction of arrows 406-410 into mold cavity 402 in order to form outer molding 412. Once formed, sprue or other extraneous material may be present in inner molding 312 or outer molding 412, which may be removed after device 400 is taken out of molding cavity 402. A visual inspection, in some examples, may be performed to determine if defects are present in either inner molding 312 or outer molding 412. If defects are found in outer molding 412, then removal may occur and a new outer molding may be formed using mold cavity 402. The inspection and, if defects are found, the removal of outer molding 412 allows for higher quality moldings to be developed at a lower cost without requiring the discarding of sensitive, expensive electronics. Outer molding 412, in some examples, may also be used to provide surface ornamentation to a given object. The use of thermoplastics or TPE material may be used to form outer molding 412 and to provide material in which a surface texture, design, or pattern may be imprinted, contoured, or otherwise formed. In so doing, various types of patterns, designs, or textures may be formed of various types. For example, miniature "hills" and "valleys" may be formed in the protective material of outer molding 412 in order to produce a "denim" feel or texture to a given object. Examples of different patterns for outer molding 412 may be found in FIGS. 5A-5C, as shown by patterns 502, 512, and 522, respectively. Patterns 502, 512, and 522 are provided for purposes of illustration and are neither limiting nor restrictive with regard to the types, patterns, designs, or textures of surface ornamentation that may be applied to outer molding 412, as described herein. Protective material (e.g., TPE) injected into mold cavity 402 may be used to form these patterns. Various types of injection molding processes and equipment may be used and are not limited to any specific type, make, manufacture, model, or other specification.

Referring back to FIG. 4, the use of the described techniques allows for more precise tolerances in forming moldings that are form-fitting to various types of devices. Still further, the use of the above-described techniques also allows for relatively small devices having sensitive electronics to be subjected to harsh environmental conditions during molding processes in order to form protective layers inner molding 312, outer molding 412) over various types of devices. As shown and described, the disclosed techniques may be used on a variety of devices, without limitation or restriction. In other examples, device 400 and the above-described elements may be varied in function, structure, configuration, implementation, or other aspects and are not limited to those provided.

Figure 6A:
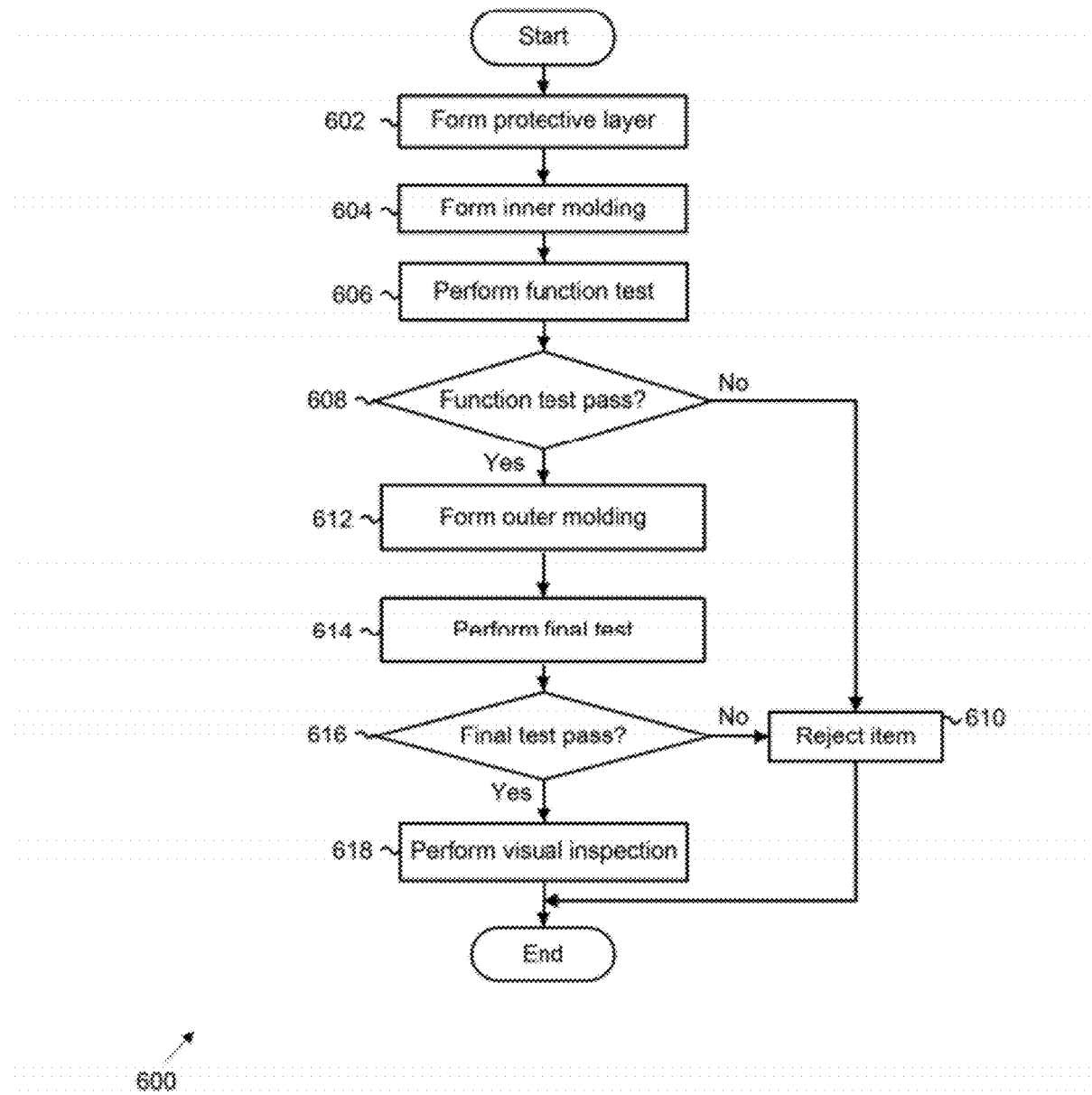
FIG. 6A illustrates an exemplary process for component protective overmolding.

FIG. 6A illustrates an exemplary process for component protective overmolding. Here, the start of process 600 includes forming a protective layer on, for example, framework 102 (FIG. 1) (602). In some examples, a protective layer may refer to protective material, layers, or covers such as protective material 108 (FIG. 2) or structures that are formed to protect underlying elements (e.g., covering 108 (FIG. 1). Examples of material that may be used to form a protective layer include UV curable materials such as those described above, including coatings, adhesives, liquids, gels, and others that cure when exposed to ultraviolet radiation in various concentrations and exposure levels without limitation. After forming a protective layer (e.g., protective coating 208), an inner molding (e.g., inner molding 312 (FIG. 3)) is formed (604). After forming an inner molding, a function test is performed to determine whether the inner molding and protective layer have damaged the underlying item (606). In some examples, a function test may be performed as part of an inspection and include applying an electrical current to an underlying electronic element to identify proper voltage or current flow or other parameters that indicate whether damage has occurred during the formation of a protective layer, an inner molding, or, in other examples, an outer molding. Inspections may be performed at various stages of the manufacturing process in order to identify defects early and reduce costs incurred with re-applying protective layers or moldings. In other examples, a function test may be performed to determine whether the inner molding has sufficiently coated desired underlying items (e.g., electrical, electronic, mechanical, or any structure or elements thereof that are being protected from damage using one or more moldings). In still further examples, the function test may be performed to determine whether the formation of an inner molding damaged underlying items that were previously protected by the formation of protective layer, the latter of which may be performed outside of a mold device or cavity (e.g., mold cavity 302 (FIG. 3) or mold cavity 402 (FIG. 4)) at room temperature and/or atmospheric conditions, including atmospheric or ambient temperatures, pressures, and humidity levels, without limitation.

in some examples, a determination is made as to whether a function test is passed or failed (608). Here, if an item having a protective layer and an inner molding fails to pass, the item is rejected and the process ends (610). Alternatively, if an item (e.g., framework 102 and elements 106-108 (FIG. 1)) fails to pass a function test due to the presence of one or more defects, the inner molding may be removed and re-applied. In other examples, the underlying item may be rejected (i.e., destroyed, recycled, or otherwise removed from a lot of items that have successfully passed a function test). If a determination is made that a function test has passed as part of an inspection, then an outer molding is formed over the inner molding and protective layer (612).

In some examples, the protective layer, inner molding, and outer molding may be selectively, partially, or completely applied to a given item. As described here, an outer molding may also be configured to completely enclose or encase an underlying item in order to protect the inner molding, the protective layer, and any elements from damage. Further, outer molding may be used to form patterns, designs, or other surface features or contours for usable, functional, or aesthetic purposes. As shown here, after an outer molding is formed, a final test is performed to determine whether defects are present or the formation of the outer molding met desired parameters (e.g., did the outer molding fully coat an item, were any underlying items damaged, and the like) (614). In some examples, a final test may also be a function test, as described above. In other examples, a final test may also evaluate an item coated with an outer molding for other purposes. If the final test is not passed, then the item may be rejected and, in some examples, the outer molding may be removed and re-applied (i.e., re-formed) (610). In other example, a failed final test may also result in the item being rejected and destroyed, recycled, or otherwise handled as unacceptable. Finally, after a final test is performed a visual inspection may be performed to determine whether an item has been covered by the formed outer molding as desired (618). In other examples, process 600 may be implemented differently in the order, function, configuration, or other aspects described and is not limited to the examples shown and described above.

Figure 6B:
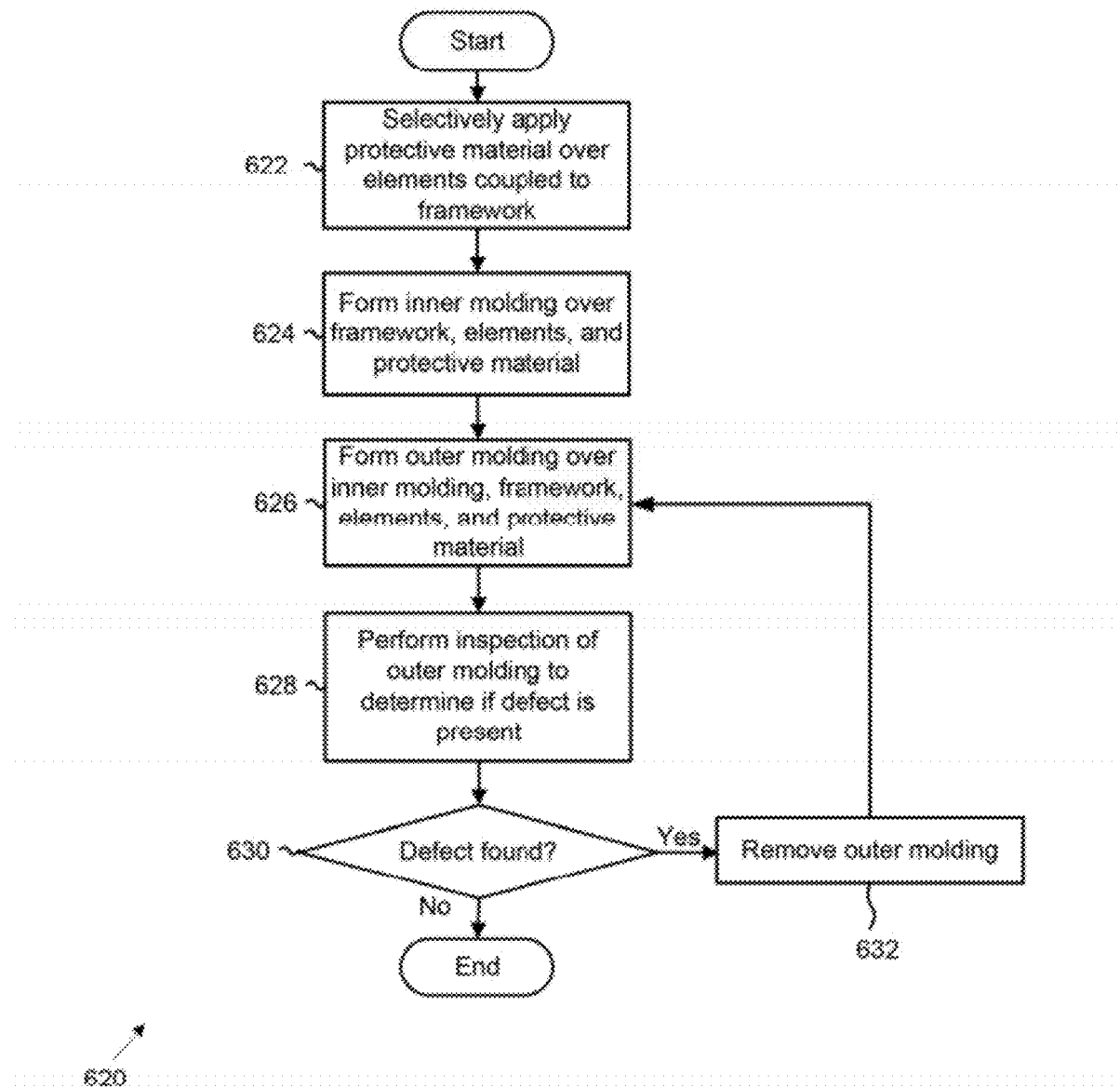
FIG. 6B illustrates an alternative exemplary process for component protective overmolding.

FIG. 6B illustrates an alternative exemplary process for component protective overmolding. Here, process 620 beings be selectively applying protective material (e.g., protective coating 208 (FIG. 2)) to one or more elements (e.g., electrical, electronic, mechanical, structural, or others) (622). In some examples, selectively applying protective material may include manually using an applicator (e.g., syringe 202 (FIG. 2) or any other type of instrument, device, tool, or implement used to apply protective material) to deposit a layer, covering, coating, or the like over a desired element. In other examples, selectively applying may also include the application of protective material to one, some, all, or none of the elements present on a given item. In other words, selectively applying protective material may be performed uniformly or non-uniformly without limitation. Types of protective materials may include curable or non-curable materials such as those described above, including UV-curable coatings that, when exposed to ultraviolet radiation, cure. In other examples, other types of coatings may be used that, when exposed to artificial or man-made conditions, cure. Still further, other types of coatings may be used to form a protective layer (i.e., protective material) over sensitive elements that may require the combination of two or more materials, chemicals, or compounds, such as epoxies, polymers, elastomers, and the like, without limitation.

Here, after selectively applying protective material an inner molding is formed over a framework, associated elements (i.e., elements coupled to the framework), and the previously, selectively-applied protective material (624). As an example of a framework, a "strapband" or, as used herein, "band" may refer to a wearable device that is configured for various data capture, analysis, communication, and other purposes. In some examples, a band may refer to a wearable personal data capture device that, when worn, may be used to record and store various types of data associated with a given person's motion, behavior, and physical characteristics (e.g., body temperature, salinity, blood sugar, heart rate, respiration rate, movement, and many others, without limitation). In other examples, a band may be implemented using hardware, software, and firmware, where application-specific programs may be downloaded onto a memory that is included as an element and protected using the described overmolding processes. A band may be implemented as described below in connection with FIGS. 7-9.

Referring back to FIG. 6B, an outer molding is formed over the inner molding, the framework, its elements, and the protective material (626). After the outer molding is formed, an inspection of the outer molding is performed to determine whether a defect is present (628). As used herein, an inspection may refer to any type of process (e.g., automatic, semi-automatic, manual, robotic, visual, structural, radiological, electrical, or others) that is used to determine whether a defect is present. In some examples, an inspection may include one or more function (i.e., functional) tests to determine whether a coated (i.e., item receiving protective material and protective layers or coatings) has been damaged during the layering process. If a defect (e.g., a damaged item or defective molding) is found, then the outer molding is removed (632) and formed again over the inner molding, framework, elements, and protective material (626). If no defect is found, then the process ends. Examples of materials that may be used for moldings (e.g., inner molding, outer molding) in process 620 include plastics, thermoplastics, thermoplastic elastomers, polymers, thermoplastic polymer elastomers, epoxies, alloys, metals, or any other type of organic or synthetic material, without limitation. In other examples, process 620 may be implemented differently in the order, function, configuration, or other aspects provided and is not limited to the examples shown and described above.

Figure 6C:
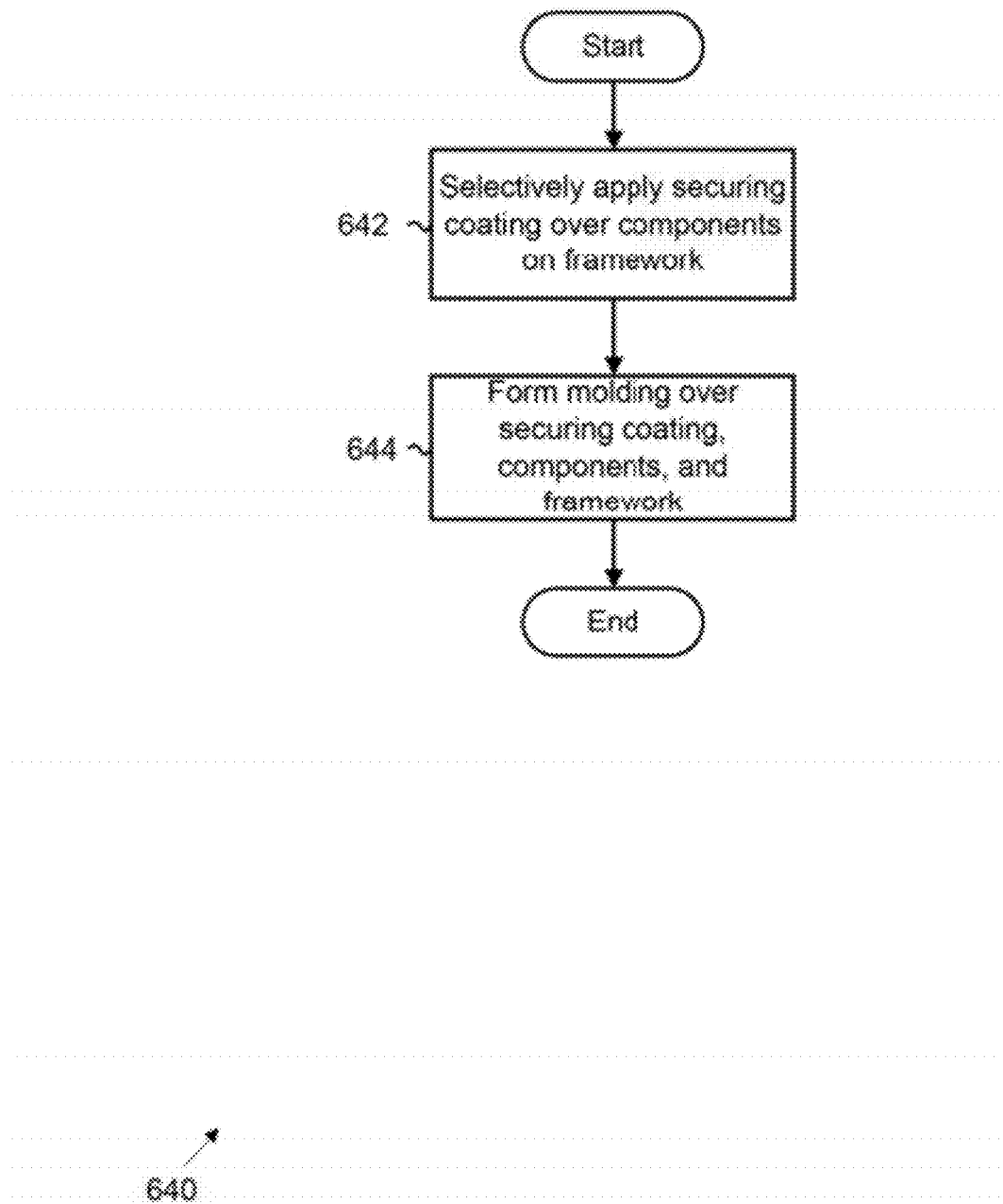
FIG. 6C illustrates another alternative exemplary process for component protective overmolding.

FIG. 6C illustrates another alternative exemplary process for component protective overmolding. Here, an alternative 2-stage process 640 for component protective overmolding, may be performed. First, selective application of a securing coating over components placed on, for example, a framework, may be performed (642). As used herein, a securing coating may refer to any type of protective material, layer, cover, structure, liquid, gel, solid, or the like that is placed substantially (i.e., partially or entirely) over an item in order to prevent damage from later stages of a manufacturing process (e.g., introduction into mold cavity 302 (FIG. 3) or mold cavity 402 (FIG. 4) in which rigorous temperatures, pressures, or other environmental conditions are created in order to apply other coated materials. Further, due to the size and relatively sensitive operating, manufacturing, and performance characteristics of various electrical, electronic, mechanical, or structural features (e.g., microprocessors, solid state computer memories, control logic and circuitry, microvibrators, motors, motor controllers, batteries, battery modules, battery controllers, and the like), the addition of protective material can prevent inadvertent damage and increased costs occurring during the manufacturing of finished products. As an example, consumer electronics devices receiving both aesthetic and functional protective overmoldings (i.e., moldings) can be expensive to manufacture because, for each damage underlying electronic component, an entire unit must be discarded. However, by using the described techniques to protect sensitive and expensive elements by replacing moldings as opposed to entire partially-finished items, manufacturing costs can be significantly reduced, thus increasing profit margins and incentives for individuals and enterprises to commercially invest in manufacturing devices that can advantageously capture, analyze, use, communicate (via wired or wireless data communication facilities (e.g., network interface cards (NICs), wireless radios using various types of wireless data communication protocols for short, medium, and long-range communication (e.g., Bluetooth™, ZigBee, ANT™, WiFi, WiMax, and others), and the like), or otherwise use valuable and abundant personal data. As an example of these types of devices, a strapband or band may be a wearable device that is configured to capture data such as that described above. Sensitive elements of various sizes and shapes may be protected from damage occurring during later stages of protective overmolding (i.e., application of protective layers, covers, molds, or the like) using the described techniques.

Here, after applying a securing coating, another molding may be formed over the securing coating, band, and components (e.g., elements) (644). As described here and above, the application of one or more moldings may be performed to both secure and protect underlying items (e.g., components or elements) of a finished product for various conditions such as use, weather, shock, temperature, or other environmental conditions to which finished products (e.g., band) may be subjected. In other examples, more, fewer, or different steps may be implemented as part of process 620 including, for example, a single-stage process involving the application of one or more protective layers (e.g., housings, coverings, securing coatings, coatings; moldings, or the like). The functions, operations, or processes performed during a single or multi-stage or step process may be varied, without limitation, to include more, fewer, or different types of sub-processes apart from those shown and described. Alternatively, more steps in process 620 may be implemented are not limited to any of the examples shown and described. In still other examples, process 620 may be implemented differently in the order, function, configuration, or other aspects provided and is not limited to the examples shown and described above.

Figure 6D:
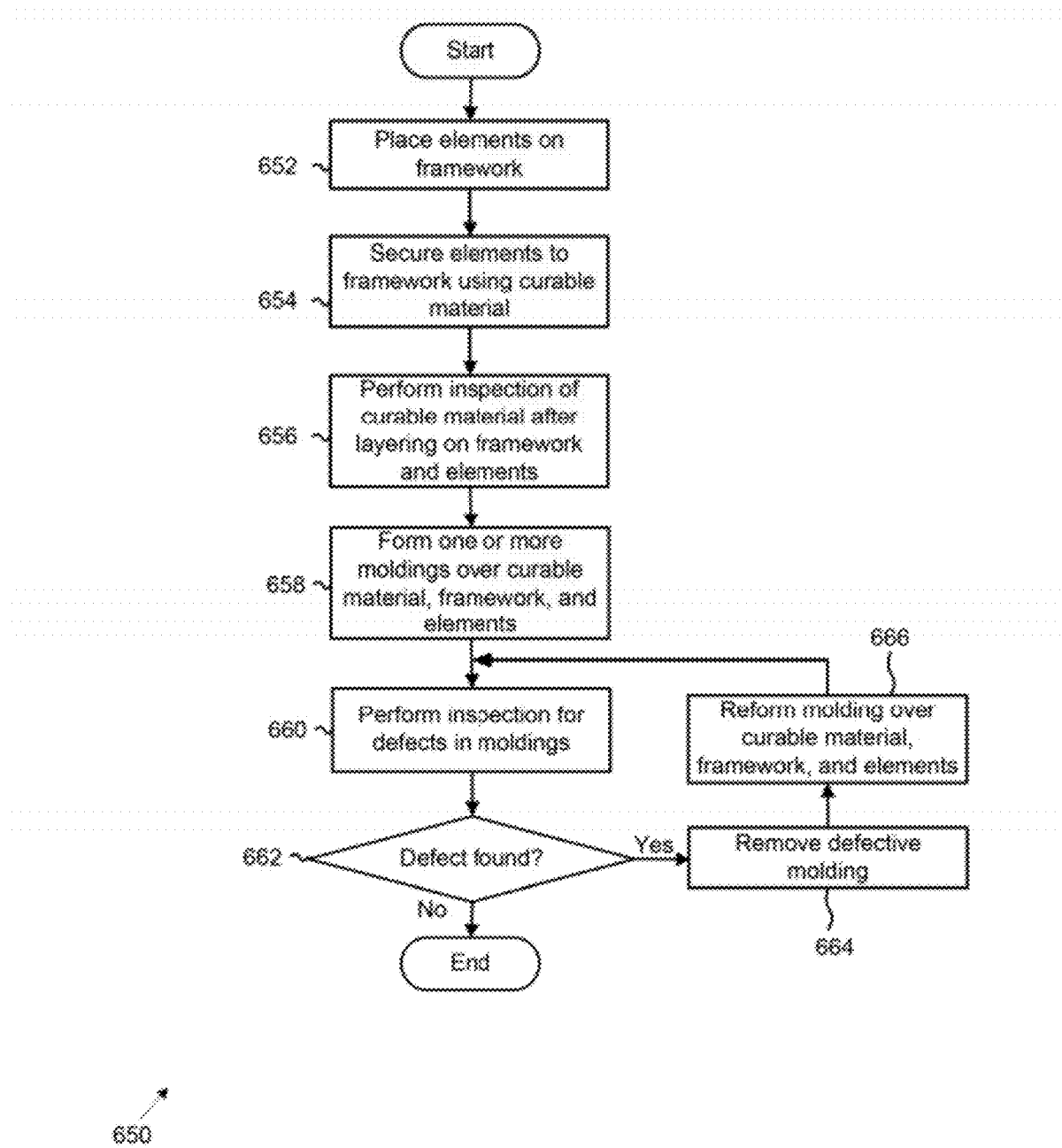
FIG. 6D illustrates yet another alternative exemplary process for component protective overmolding.

FIG. 6D illustrates yet another alternative exemplary process for component protective overmolding. Here, process 650 begins by placing one or more elements on a framework (652). In some examples, the one or more elements may be placed on a part of a framework (not shown) or other support structure configured to provide a substrate or base support. Once placed, the elements are coated using a curable material (654). As an example of a curable material, Loctite® 5083 UV curable coating may be layered (i.e., deposited, poured, injected, layered, or otherwise covered) over the elements and the framework. The curable material may be comprehensively, universally, uniformly, semi-uniformly, irregularly, or selectively placed so that some elements are covered while others are left uncovered. Reasons for selectively applying the curable coating may include other elements being protected from damage during the molding process using physical structures (e.g., covering 108) and yet others being manufactured to withstand the environmental conditions (e.g., temperature ranges between 400 and 460 degrees Fahrenheit and injection nozzle pressures of 200 to 600 pounds per square inch (psi)) of molding cavity 302 (FIG. 3) or 402 (FIG. 4) without using protective material.

After securing elements to a framework using curable material (e.g., UV curable coating, which may also be replaced with other types of curable coating, without limitation or restriction to any specific type), an inspection may be performed to determine whether there are any defects, gaps, openings, or other susceptibilities that can be anticipated before applying the first or inner molding (656). After performing an inspection on the curable coating, one or more moldings may be formed over the curable material (i.e., coating), framework, and elements (658) after which an inspection may be performed to determine whether there are defects in the molding(s) (660). During the inspection, a determination is made as to whether a defect has been found in one or more moldings (662). If a defect is found, the defective molding is removed (664) and another molding may be reformed over the curable material, framework, and elements (666). By enabling a defective molding to be replaced without requiring the discard of a framework and its associated elements (e.g., electrical and electronic components such as microprocessors, processors, data storage and computer memory, sensors (e.g., accelerometers, motion/audio/light sensors, velocimeters, pedometers, altimeters, heart rate monitors, barometers, chemical/protein detectors, and others, without limitation), mechanical and structural features or functionality), substantial costs can be saved thus enabling devices to be produced at lower costs to consumers and business alike. In other examples, process 650 may be implemented differently in the order, function, configuration, or other aspects provided and is not limited to the examples shown and described above.

Figure 7:
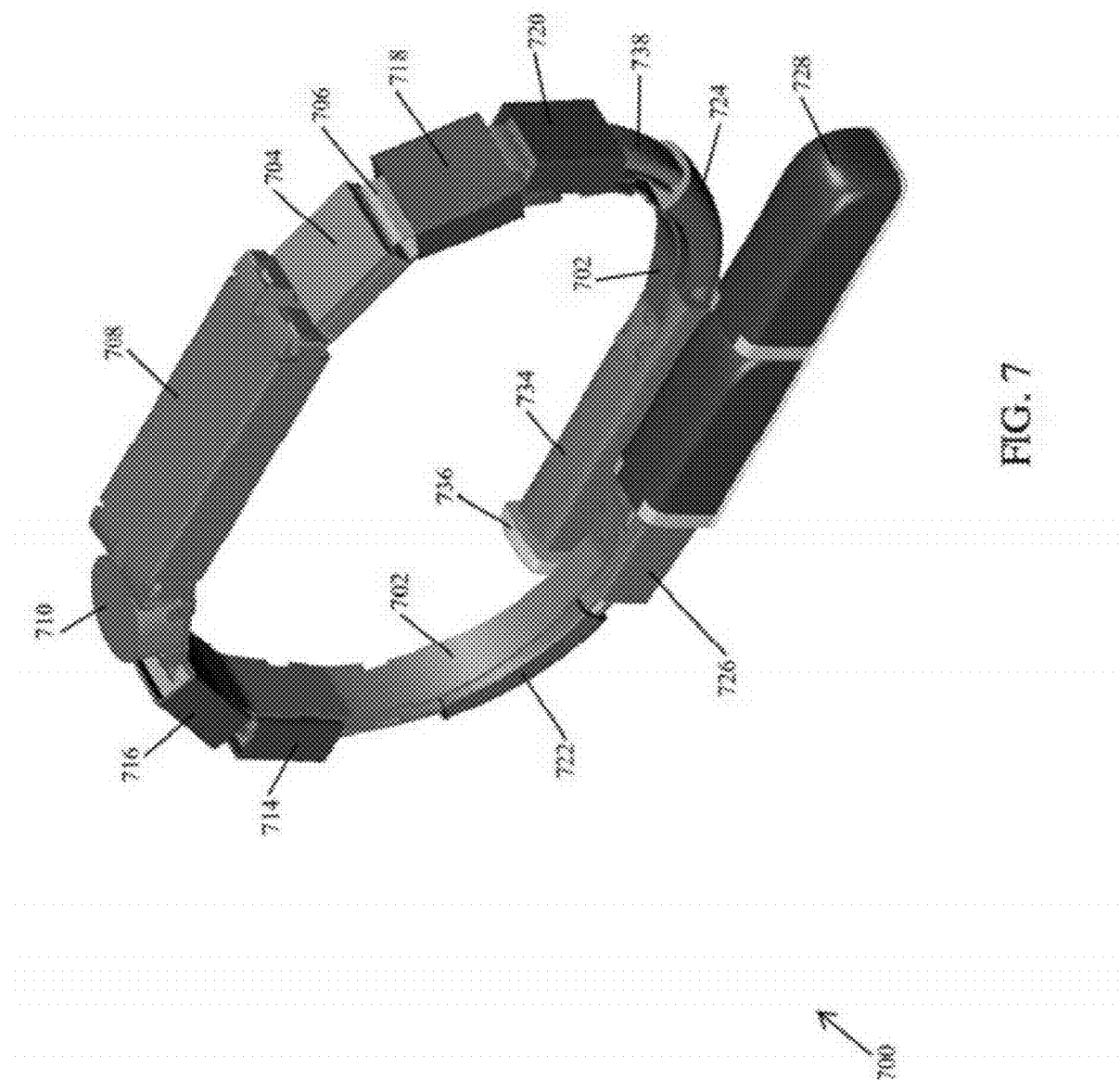
FIG. 7 illustrates a view of an exemplary data-capable strapband configured to receive overmolding.

FIG. 7 illustrates a side view of an exemplary data-capable strapband configured to receive overmolding. Here, band 700 includes framework 702, covering 704, flexible circuit 706, covering 708, motor 710, coverings 714-724, analog audio plug 726, accessory 728, control housing 734, control 736, and flexible circuit 738. In some examples, band 700 is shown with various elements (i.e., covering 704, flexible circuit 706, covering 708, motor 710, coverings 714-724, analog audio plug 726, accessory 728, control housing 734, control 736, and flexible circuit 738) coupled to framework 702. Coverings 708, 714-724 and control housing 734 may be configured to protect various types of elements, which may be electrical, electronic, mechanical, structural, or of another type, without limitation. For example, covering 708 may be used to protect a battery and power management module from protective material formed around band 700 during an injection molding operation. As another example, housing 704 may be used to protect a printed circuit board assembly ("PCBA") from similar damage. Further, control housing 734 may be used to protect various types of user interfaces (e.g., switches, buttons, lights, light-emitting diodes, or other control features and functionality) from damage. In other examples, the elements shown may be varied in quantity, type, manufacturer, specification, function, structure, or other aspects in order to provide data capture, communication, analysis, usage, and other capabilities to band 700, which may be worn by a user around a wrist, arm, leg, ankle, neck or other protrusion or aperture, without restriction. Band 700, in some examples, illustrates an initial unlayered device that may be protected using the techniques for protective overmolding as described above.

Figure 8:
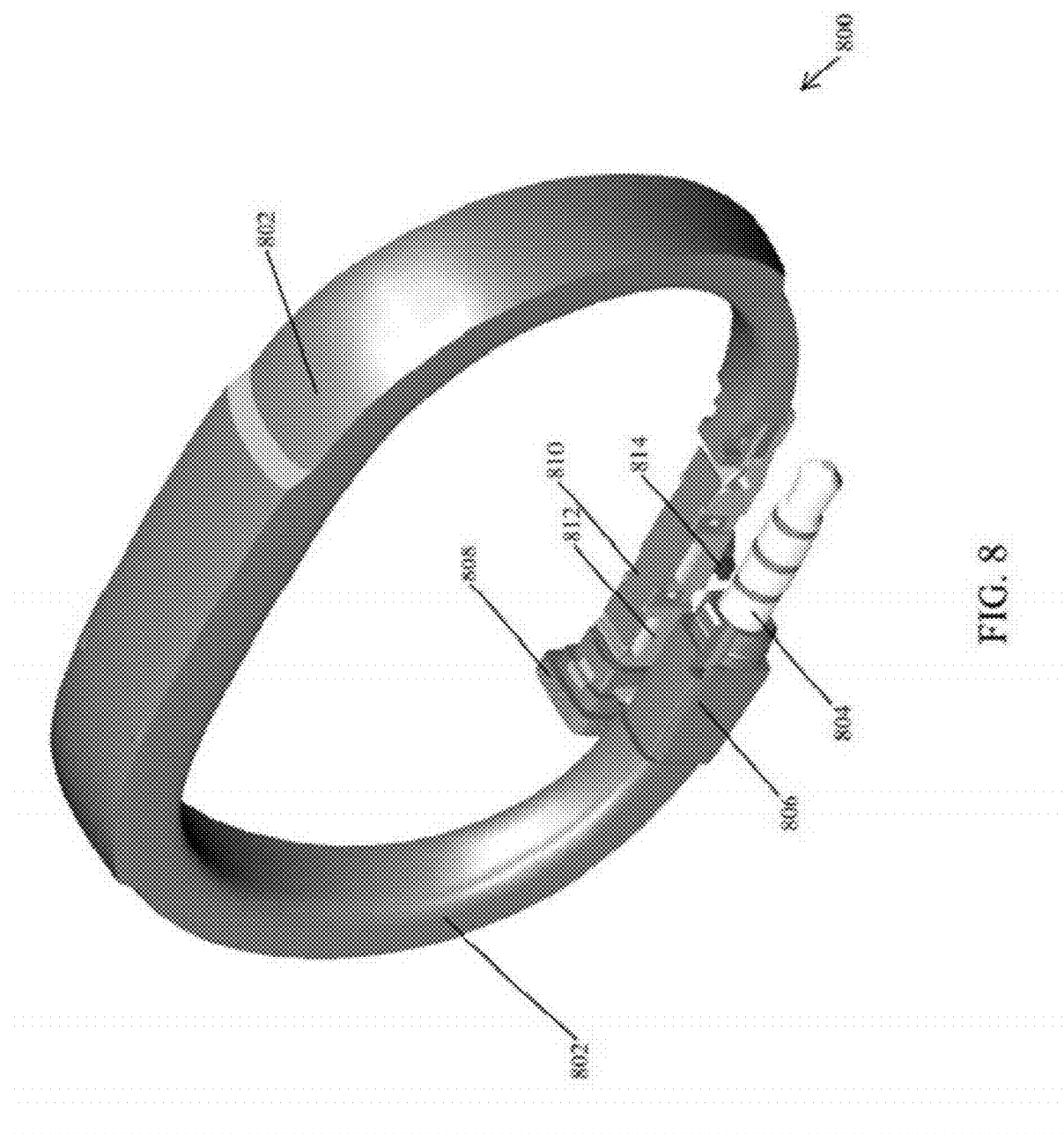
FIG. 8 illustrates a view of an exemplary data-capable strapband having a first molding.

FIG. 8 illustrates a view of an exemplary data-capable strapband having a first molding. Here, band 800 includes molding 802, analog audio plug (hereafter "plug") 804, plug housing 806, button 808, framework 810, control housing 812, and indicator light 814. In some examples, a first protective overmolding (i.e., molding 802) has been applied over band 700 (FIG. 7) and the above-described elements (e.g., covering 704, flexible circuit 706, covering 708, motor 710, coverings 714-724, analog audio plug 726, accessory 728, control housing 734, control 736, and flexible circuit 738) leaving some elements partially exposed (e.g., plug 804, plug housing 806, button 808, framework 810, control housing 812, and indicator light 814). However, internal PCBAs, flexible connectors, circuitry, and other sensitive elements have been protectively covered with a first or inner molding that can be configured to further protect band 800 from subsequent moldings formed over band 800 using the above-described techniques. In other examples, the type, configuration, location, shape, design, layout, or other aspects of band 800 may be varied and are not limited to those shown and described. For example, plug 804 may be removed if a wireless communication facility is instead attached to framework 810, thus having a transceiver, logic, and antenna instead being protected by molding 802. As another example, button 808 may be removed and replaced by another control mechanism (e.g., an accelerometer that provides motion data to a processor that, using firmware and/or an application, can identify and resolve different types of motion that band 800 is undergoing), thus enabling molding 802 to be extended more fully, if not completely, over band 800. In yet other examples, molding 802 may be shaped or formed differently and is not intended to be limited to the specific examples shown and described for purposes of illustration.

Figure 9:
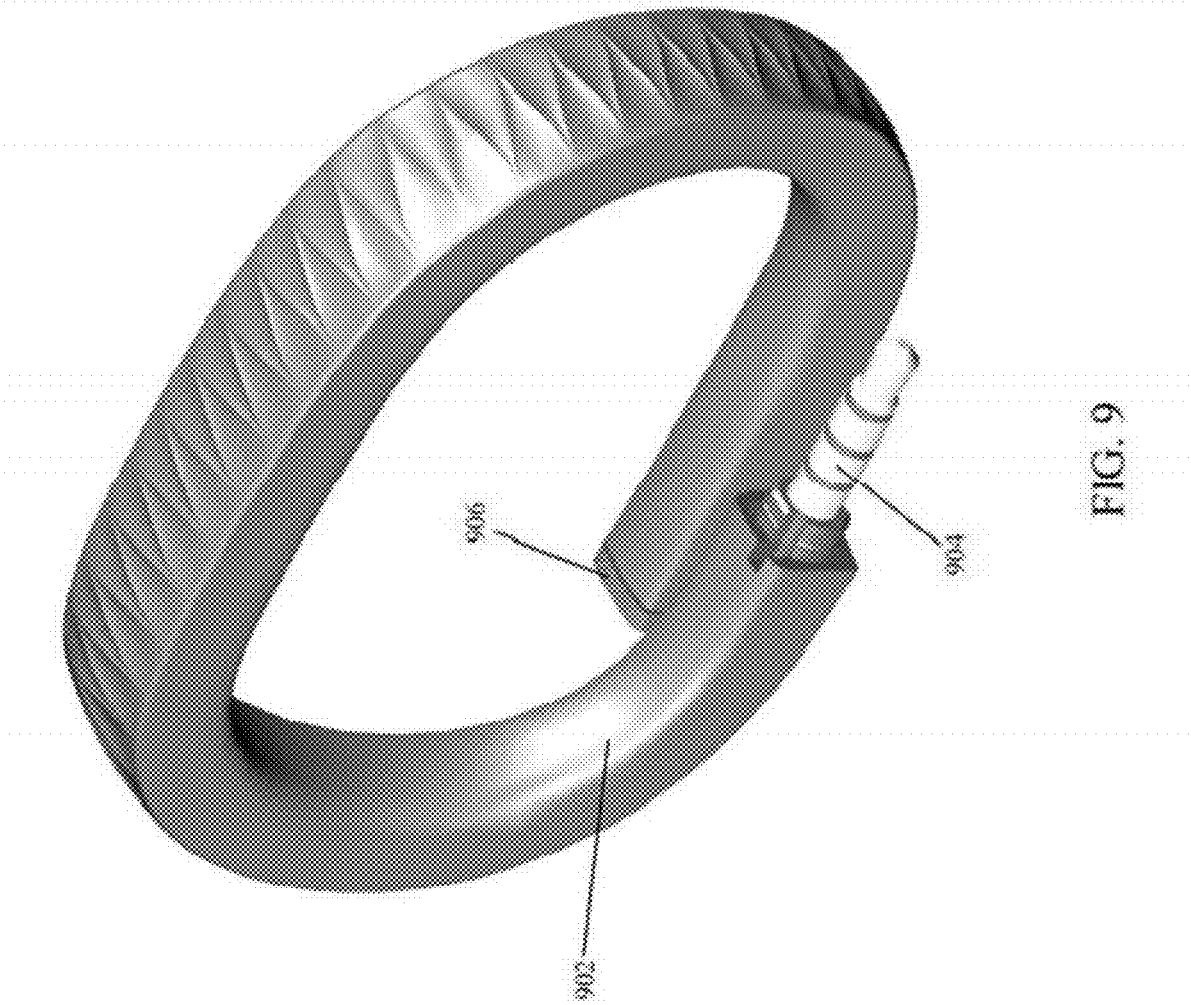
FIG. 9 illustrates a view of an exemplary data-capable strapband having a second molding.

FIG. 9 illustrates a view of an exemplary data-capable strapband having a second molding. Here, band 900 includes molding 902, plug 904, and button 906. As shown another overmolding or protective material has been formed by injection molding, for example, molding 902 over band 900. As another molding or covering layer, molding 902 may also be configured to receive surface designs, raised textures, or patterns, which may be used to add to the commercial appeal of band 900. In some examples, band 900 may be illustrative of a finished data capable strapband (i.e., band 700 (FIG. 7), 800 (FIG. 8) or 900) that may be configured to provide a wide range of electrical, electronic, mechanical, structural, photonic, or other capabilities.

Here, band 900 may be configured to perform data communication with one or more other data-capable devices (e.g., other bands, computers, networked computers, clients, servers, peers, and the like) using wired or wireless features. For example, a TRRS-type analog audio plug may be used (e.g., plug 904), in connection with firmware and software that allow for the transmission of audio tones to send or receive encoded data, which may be performed using a variety of encoded waveforms and protocols, without limitation. In other examples, plug 904 may be removed and instead replaced with a wireless communication facility that is protected by molding 902. If using a wireless communication facility and protocol, band 900 may communicate with other data-capable devices such as cell phones, smart phones, computers (e.g., desktop, laptop, notebook, tablet, and the like), computing networks and clouds, and other types of data-capable devices, without limitation. In still other examples, band 900 and the elements described above in connection with FIGS. 1-9, may be varied in type, configuration, function, structure, or other aspects, without limitation to any of the examples shown and described.

Figure 10:
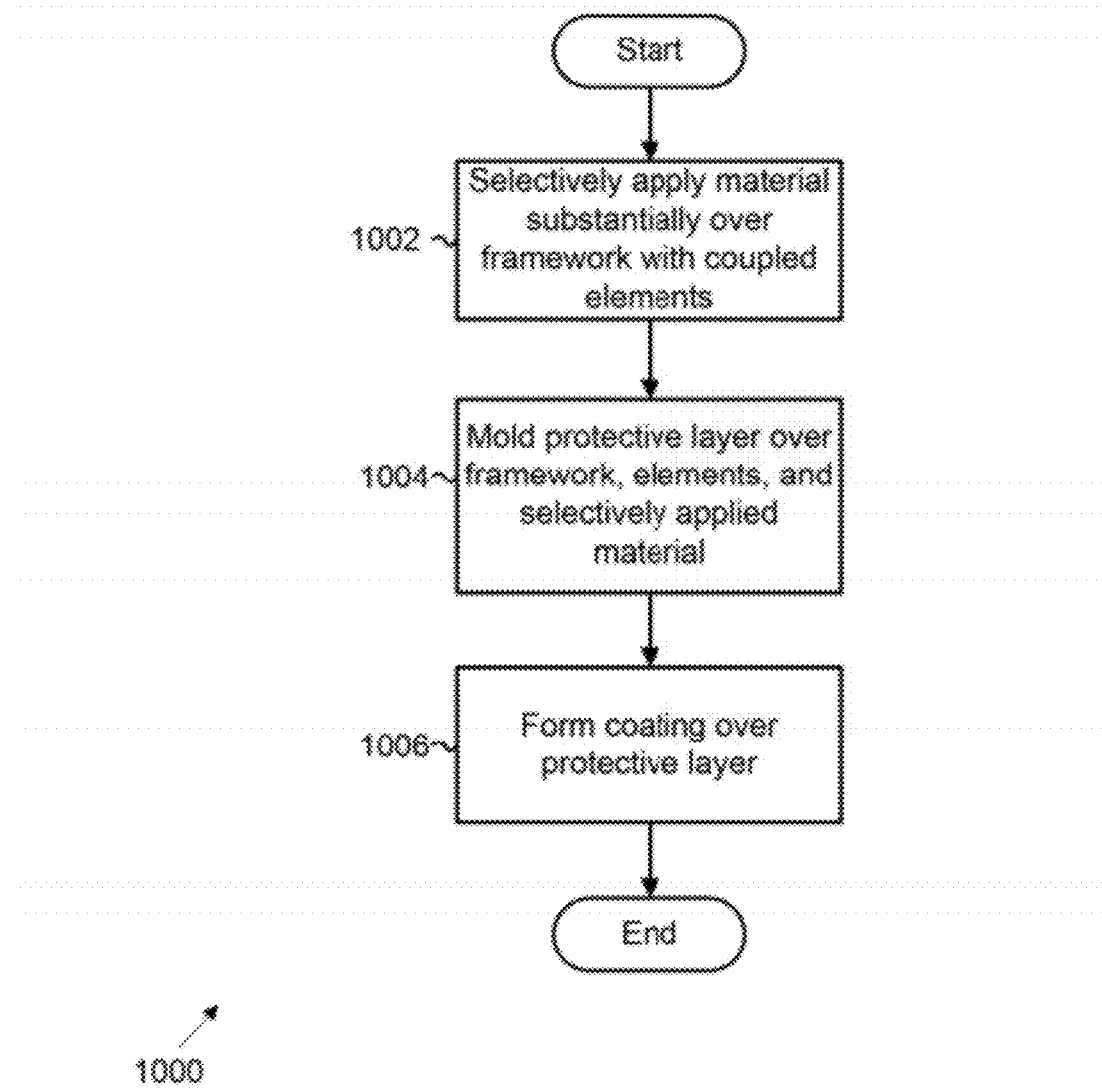
FIG. 10 illustrates an exemplary process for component protective overmolding using protective external coatings.

FIG. 10 illustrates an exemplary process for component protective overmolding using protective external coatings. Here, process 1000 includes selectively applying a material (such as those described above) substantially over a framework that is coupled to one or more elements (1002). Selective application of the material, in some examples, may refer to point applications of a material an epoxy or other material used to protect an underlying element from being damaged during subsequent deposition, formation, or molding phases of other material). As used herein, a framework may be an internal substrate, wafer, stiffener, or the like, providing, both an internal structure for bands 700-900 (FIGS. 7-9) and a structure to which the one or more elements may be mounted or coupled, either directly or indirectly. In some examples, the one or more elements may include any type of electrical, electronic, mechanical, chemical, or other type of device, component, sub-component, mechanism that is configured to receive, transmit, process, or perform a data operation (i.e., "operation") using data gathered from a sensor coupled to bands 700-900. Also, as used herein, "sensory input" may refer to any type, classification, powered or unpowered, of sensor configured to sense data and information regarding the internal or external environment of bands 700-900.

After selectively applying the material substantially over the framework coupled to one or more elements, a protective layer is molded over the framework, element(s), and selectively-applied material (1004). After molding the protective layer, a coating may be formed over the protective layer (1006). In some examples, the coating is formed to provide a protective property, as described above.

As used herein, "coating" is to be distinguished from protective coating 208 (FIG. 2) in that the former is used to provide a protective property to the structure to which it is applied. In some examples, the protective property may include protecting bands 700-900 (FIGS. 7-9) from external damage due to shock, wear, immersion (in various types of liquids, including water), temperature, pressure, or other environmental conditions (or lack thereof, including vacuum). In other examples, a protective property may be a characteristic of a coating that, when applied, protects a wearer or users. For example, material used for a coating may include anti-bacterial or medical-grade (i.e., any type of material or combination of materials, synthetic or organic, that have been tested and deemed suitable for biological uses, including those internal and external to organisms or bodies) materials such as TPE, polymers, elastomers, and others. Other protective properties of a coating may include being water-proof, water-resistant, oleophobic, hydrophobic, hardened (i.e., protected from damage due to shock, which may require shock or impact-absorbent materials that distribute kinetic energy when applied via force or pressure), ultraviolet radiation (hereafter "UV")-protective or resistive (i.e., resists color fading), and others, without limitation. Protective properties may refer to any property that protects the framework, elements, material, moldings, coatings, or the like from either external or internal damage or conditions that could result in damage. In other examples, process 1000 may be implemented differently in the order, function, configuration, or other aspects provided and is not limited to the examples shown and described above.

Figure 11:
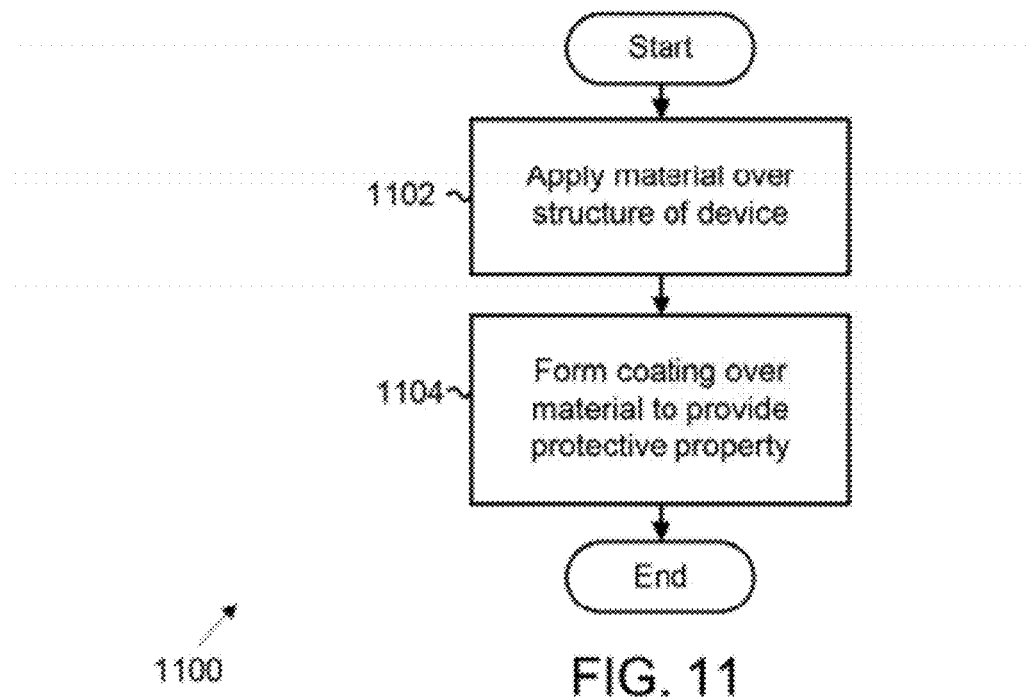
FIG. 11 illustrates an alternative exemplary process for component protective overmolding using protective external coatings.

FIG. 11 illustrates an alternative exemplary process for component protective overmolding using protective external coatings. As an alternative process to those described above, material may be provided (e.g., formed, molded, deposited, sprayed, dipped, applied with a brush (i.e., brushed), or the like) over a structure of a device (1102). In some examples, a device (e.g., bands 700-900 (FIGS. 7-9)) may be configured to perform one or more operations, as described above, using data received from various types and quantities of sensory inputs. As used herein, the material may be applied to secure an element (e.g., a sensor, battery, motor, detector, circuit, or any other type of element, as described above) to a framework or stiffener of a device. Applying material may also refer to the molding of a layer of material over a framework and elements, providing a hermetic or substantially hermetic or waterproof enclosure. In other examples, applying material may refer to the formation of a single or multiple layers of material over a device. After applying the material, a coating is formed over it to provide a protective property, such as those described above (1104). In other examples, process 1100 may be implemented differently in the order, function, configuration, or other aspects described and is not limited to the examples provided above.

Figure 12:
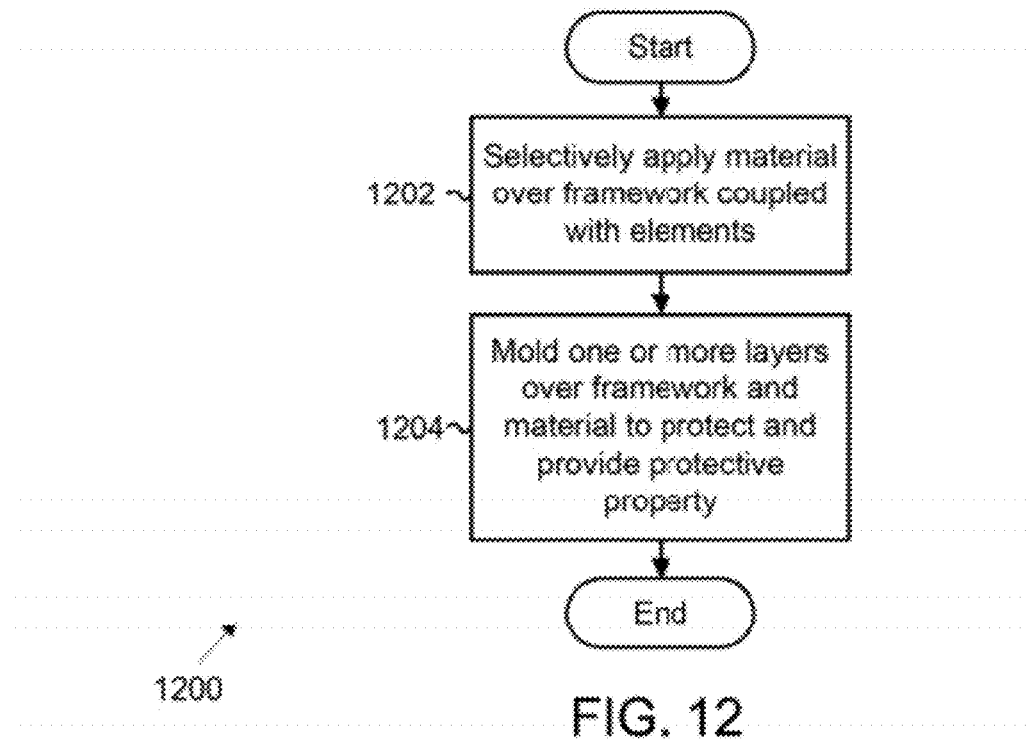
FIG. 12 illustrates another alternative exemplary process for component protective overmolding using protective external coatings.

FIG. 12 illustrates another alternative exemplary process for component protective overmolding using protective external coatings. As a further alternative process to those described above, material is selectively applied over a framework coupled to one or more elements (1202). After applying the material over the framework and coupled element(s), one or more layers (e.g., coatings, such as those described above) are molded to provide a protective property (1204). In other examples, process 1200 may be implemented differently in the order, function, configuration, or other aspects described and is not limited to the examples provided above.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   selectively applying at least one covering substantially over one or more of a plurality of elements coupled with a framework for a wearable device configured to be worn by a user, the plurality of elements including at least a sensor;
   selectively forming a first inner molding that covers all or substantially all of the at least one covering, the plurality of elements, and the framework;
   selectively forming a second inner molding that covers all or substantially all of the first inner molding; and
   selectively forming an outer molding of the wearable device, the outer molding covering all or substantially all of the second inner molding, the outer molding configured to be positioned in contact with the user.

2. The method of claim 1, wherein the outer molding comprises an anti-bacterial material.

3. The method of claim 1, wherein the outer molding comprises an oleophobic material.

4. The method of claim 1, wherein the outer molding is configured to protect against ultraviolet radiation.

5. The method of claim 1, wherein the outer molding comprises a hydrophobic material.

6. The method of claim 1, wherein the outer molding is configured to provide a waterproof seal over the plurality of elements.

7. The method of claim 1, wherein a pattern is formed on the outer molding.

8. The method of claim 1, further comprising performing an inspection of the outer molding to determine if the outer molding is defective.

9. The method of claim 8, further comprising:
   removing the outer molding after determining the outer molding is defective; and
   re-forming the outer molding.

10. The method of claim 1, wherein the framework is comprised of a synthetic fiber.

11. The method of claim 1, wherein the framework is formed using carbon fiber.

12. The method of claim 1, wherein the framework is comprised of one or more filaments.

13. The method of claim 1, wherein the framework is formed using a thermoplastic elastomer.

14. The method of claim 13, wherein the thermoplastic elastomer comprises polypropylene.

15. The method of claim 1, wherein the at least one covering comprises a curable coating.

16. A method, comprising:
    selectively applying at least one protective material substantially over one or more of a plurality of elements coupled with a framework for a wearable device configured to be worn by a user, the plurality of elements including at least a sensor;
    forming one or more inner moldings substantially over a subset or all of the framework, the at least one protective material and the plurality of elements, after the selectively applying, at least one of the one or more inner moldings having a protective property; and
    forming an outer molding of the wearable device that covers all or substantially all of the one or more inner moldings, the outer molding configured to be positioned in contact with the user.

17. The method of claim 16, wherein the plurality of elements are configured to perform an operation using data from the sensor.

18. The method of claim 16, wherein the protective property is waterproofing.

19. The method of claim 16, wherein the protective property is water-resistance.

20. The method of claim 16, wherein the protective property is being hydrophobic.

21. The method of claim 16, wherein the protective property is being oleophobic.

22. The method of claim 16, wherein the protective property is being anti-bacterial.

23. The method of claim 16, wherein the at least one protective material is configured to protect the one or more of the plurality of elements from damage occurring during the forming of the one or more inner moldings.

24. The method of claim 16, wherein at least one of the one or more inner moldings comprises a medical-grade thermoplastic elastomer.

25. The method of claim 16, further comprising removing and re-applying at least one of the one or more inner moldings after an inspection of the one or more inner moldings.

26. The method of claim 16, at least one protective material comprises a curable coating.

* * * * *